(12) United States Patent
Kothari et al.

(10) Patent No.: US 11,059,229 B2
(45) Date of Patent: Jul. 13, 2021

(54) RULES FOR PRINTING THREE-DIMENSIONAL PARTS

(71) Applicant: HEWLETT-PACKARD DEVELOPMENT COMPANY, L.P., Houston, TX (US)

(72) Inventors: Sunil Kothari, Palo Alto, CA (US); Jun Zeng, Palo Alto, CA (US); Kristopher Li, Palo Alto, CA (US); Goffril Obegi, Vancouver, WA (US); Lihua Zhao, Palo Alto, CA (US); Gary J. Dispoto, Palo Alto, CA (US); Viseth Sean, Orange, CA (US); Tod Heiles, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 177 days.

(21) Appl. No.: 16/077,672

(22) PCT Filed: Jan. 27, 2017

(86) PCT No.: PCT/US2017/015337
§ 371 (c)(1),
(2) Date: Aug. 13, 2018

(87) PCT Pub. No.: WO2018/140033
PCT Pub. Date: Aug. 2, 2018

(65) Prior Publication Data
US 2019/0070785 A1  Mar. 7, 2019

(51) Int. Cl.
*G05B 19/4097* (2006.01)
*B29C 64/393* (2017.01)
(Continued)

(52) U.S. Cl.
CPC .......... *B29C 64/393* (2017.08); *B29C 64/386* (2017.08); *B33Y 50/00* (2014.12);
(Continued)

(58) Field of Classification Search
CPC ..... B29C 64/393; B29C 64/386; B33Y 50/00; B33Y 50/02; G05B 19/4097;
(Continued)

(56) References Cited

U.S. PATENT DOCUMENTS 6,629,093 B1 * 9/2003 Davis ..................... G06F 30/00
707/722
8,606,774 B1 * 12/2013 Makadia ................ G06F 3/048
707/723
(Continued)

FOREIGN PATENT DOCUMENTS

WO   2015022572 A2   2/2015

OTHER PUBLICATIONS

Kim et al., "Process-Level Modeling and Simulation for HP's Multi Jet Fusion 3D Printing Technology", Retrieved from Internet: https://ptolemy.berkeley.edu/projects/chess/pubs/1171/KimEtAl_3DPrinting_CPPS_2016.pdf, Apr. 12, 2016, 4 Pages.
(Continued)

*Primary Examiner* — Christopher E. Everett
(74) *Attorney, Agent, or Firm* — Trop Pruner & Hu PC

(57) ABSTRACT

In some examples, a request to print a first three-dimensional (3D) part is received. In response to determining that the first 3D part is not similar to any 3D part referred to by an information base, a representation of the first 3D part is extracted, an indication to conduct an operation to produce a design rule for the first 3D part is sent. In response to determining that the first 3D part is similar to a matching 3D part referred to by the information base, a design rule for the matching 3D part is retrieved to print the first 3D part, where
(Continued)

the design rule for the matching 3D part specifies a dependency of a property of the matching 3D part on an aspect associated with printing the matching 3D part.

20 Claims, 4 Drawing Sheets

(51) Int. Cl.
    *B29C 64/386* (2017.01)
    *B33Y 50/00* (2015.01)
    *B33Y 50/02* (2015.01)

(52) U.S. Cl.
    CPC .......... *G05B 19/4097* (2013.01); *B33Y 50/02* (2014.12); *G05B 2219/35162* (2013.01); *G05B 2219/49023* (2013.01)

(58) Field of Classification Search
    CPC ........... G05B 2219/49023; G05B 2219/35162; G06F 17/40
    See application file for complete search history.

(56) References Cited

U.S. PATENT DOCUMENTS

| | | | |
|---|---|---|---|
| 8,868,230 B2 | 10/2014 | Tschanz et al. | |
| 10,466,681 B1* | 11/2019 | Jones | G05B 19/40937 |
| 2004/0249809 A1* | 12/2004 | Ramani | G06K 9/00201 |
| 2006/0106757 A1* | 5/2006 | Sakai | G05B 19/4097 |
| 2006/0156978 A1* | 7/2006 | Lipson | A61L 27/3817 |
| | | | 118/708 |
| 2008/0222568 A1* | 9/2008 | Okuwaki | G06F 30/00 |
| | | | 715/825 |
| 2011/0313878 A1* | 12/2011 | Norman | G06Q 30/06 |
| | | | 705/26.5 |
| 2012/0281013 A1* | 11/2012 | Mahdavi | G06F 30/00 |
| | | | 345/619 |
| 2014/0019299 A1* | 1/2014 | Stewart | G06Q 30/0625 |
| | | | 705/26.8 |
| 2014/0074272 A1* | 3/2014 | Cowden, IV | G06F 30/00 |
| | | | 700/97 |
| 2015/0199470 A1* | 7/2015 | Young | G06F 30/17 |
| | | | 700/98 |
| 2015/0331402 A1 | 11/2015 | Lin et al. | |
| 2016/0019270 A1* | 1/2016 | Jones | G06F 16/248 |
| | | | 700/98 |
| 2016/0085882 A1 | 3/2016 | Li et al. | |
| 2016/0096326 A1 | 4/2016 | Naware et al. | |
| 2016/0250810 A1 | 9/2016 | Lynch et al. | |
| 2016/0303803 A1 | 10/2016 | Hudson | |
| 2016/0325501 A1 | 11/2016 | Ready | |

OTHER PUBLICATIONS

Rumelhart et al., "Learning Representations by Back-Propagating Errors", Nature, vol. 323, Issue No. 9, Retrieved from Internet: http://www.cs.toronto.edu/~hinton/absps/naturebp.pdf, Oct. 9, 1986, 4 Pages.

Shamir et al., "Computational Tools for 3D Printing", Retrieved from Internet: http://computational-fabrication.com/2016/Intro_2016_v1.pdf, 2016, 117 Pages.

Zhang et al., "Build Orientation Optimization for Multi-part Production in Additive Manufacturing", Retrieved from Internet: https://link.springer.com/article/10.1007%2Fs10845-015-1057-1, 2015, 15 Pages.

* cited by examiner

RULES FOR PRINTING THREE-DIMENSIONAL PARTS

BACKGROUND

A three-dimensional (3D) printing system can be used to form 3D objects. A 3D printing process involves depositing successive layers of build material(s) under control of a computer based on an electronic representation of a 3D object. The layers are successively added until the entire 3D object is formed.

BRIEF DESCRIPTION OF THE DRAWINGS

Some implementations of the present disclosure are described with respect to the following figures.

DETAILED DESCRIPTION

Figure 1:
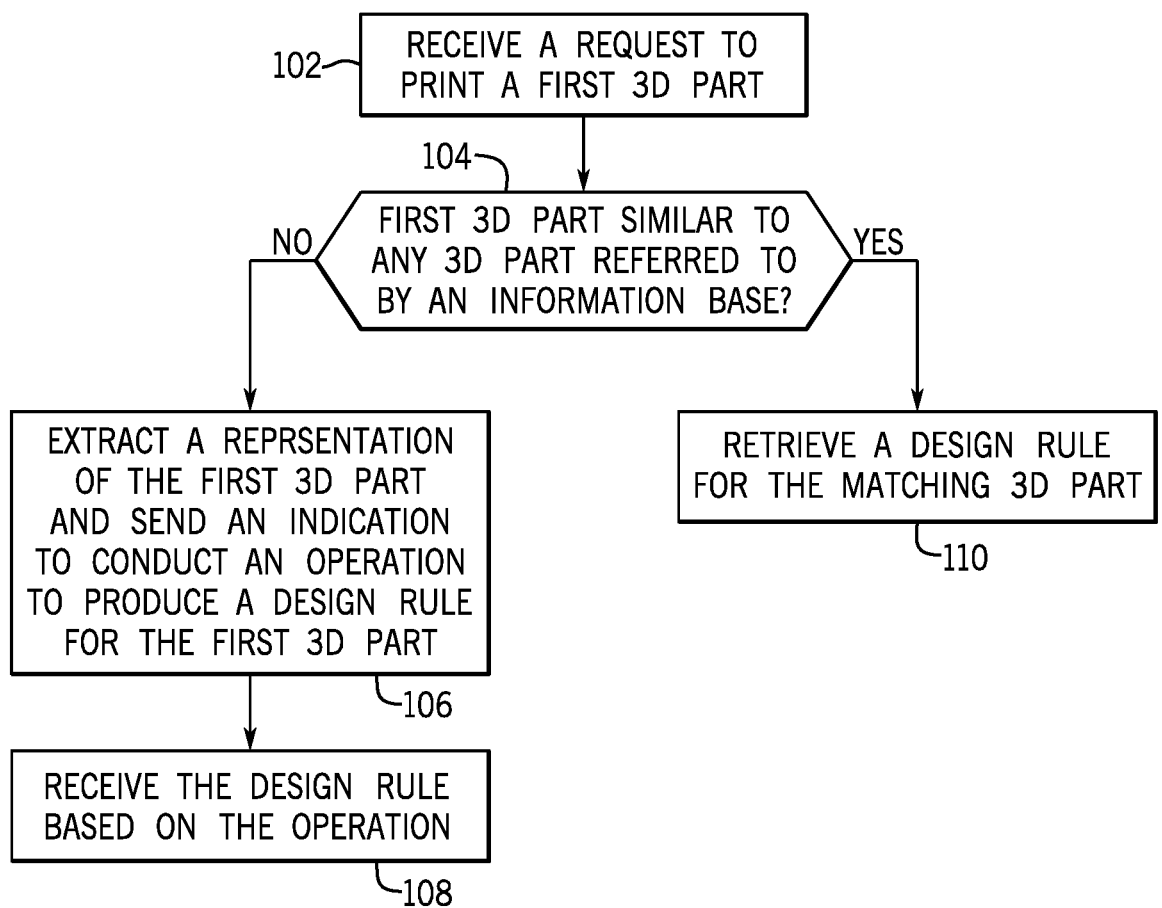
FIG. 1 is a flow diagram of three-dimensional (3D) printing according to some examples.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A build envelope associated with a three-dimensional (3D) printing system can refer to a collective assembly of layers of a 3D object that have already been printed by the 3D printing system. Due to complex printing physics, there can be non-uniformities in the build envelope, which can be due to any or some combination of the following: thermal bleed (where heat from one portion of the build envelope causes an increase in temperature of another portion of the build envelope), part-to-part interaction (where a first part formed by the 3D printing can cause thermal, mechanical, or operational interaction with another part formed by the 3D printing), physical processes of the 3D printing system (where the physical processes can include depositing build material, heating a layer of build material with a heating source, etc.), and other factors.

An example of non-uniformity can include an uneven temperature profile across a planar (horizontal) portion of the build envelope. It may be expected that, during 3D printing, the temperature across the planar portion of the build envelope is uniform. However, various factor(s) may cause the temperature to be non-uniform, with one segment of the planar portion being hotter than another segment of the planar portion. In another example, there can be non-uniformity in the density, thickness, or any other characteristic across a portion of the build envelope.

As a result of the non-uniformities in the build envelope, it can be difficult to determine where on a print target a specific part should be formed during the 3D printing. For example, some locations of the print target can have higher temperatures than other locations of the print target. Forming a part in a hotter location as compared to a cooler location can cause a mechanical or functional property of the part to vary. For example, the mechanical strength of the part formed in a hotter location can be different from the mechanical strength of the part formed in a cooler location. As a result of non-uniformities, a 3D object formed by 3D printing may exhibit properties that deviate from target values.

In accordance with some implementations of the present disclosure, solutions are provided to generate design rules that can govern how parts are to be printed by a 3D printing system. In some examples, a design rule that governs a manner of printing a 3D part by the 3D printing system is generated based on measurement data acquired by a sensor of a thermal property of printed 3D parts at multiple locations on a print target, and information relating to a physical property of the printed 3D parts at the multiple locations on a print platform. A "print platform" can refer to a bed, surface, or any other structure of a 3D printing system where a 3D object can be formed layer by layer.

In further examples, solutions according to some implementations determine whether a given 3D part of a received print request is similar to a 3D part referred to by an information base. In response to determining that the given 3D part is not similar to any 3D part referred to by the information base, a representation of the given 3D part is extracted and an indication is sent to conduct an operation to produce a design rule for the first 3D part. In response to determining that the first 3D part is similar to a matching 3D part referred to by the information base, a design rule for the matching 3D part is used to print the given 3D part.

FIG. 1 is a flow diagram of a process of performing 3D printing in a 3D printing system, in accordance with some examples. The process of FIG. 1 receives (at 102) a request to print a first 3D part. A request can refer to any message, command, information element, or other indication that is received to initiate printing of the first 3D part, where the request can include information describing the 3D part, including its shape, size, material, functional properties (e.g., magnetism, conductivity, resistivity, etc.), and so forth. For example, the print job can include content produced by a content generator, such as a computer-aided design (CAD) tool used to generate a graphical representation of the 3D part. Alternatively, the representation of the 3D part can be produced by a scanner, such as a computerized tomography (CT) scanner, which is able to take X-ray images of the physical object from different angles and to combine such X-ray images to create cross-sectional images, or image slices, of the physical object. The image(s) produced by the scanner, along with associated properties, can be included in the request to print the first 3D part. Other types of content generators can be used in other examples.

The process includes determining (at 104) whether the first 3D part is similar to a 3D part referred to by an information base. An "information base" can refer to any collection of information that can be stored in a repository, where the repository can be implemented on a storage device or a collection of storage devices that can be distributed across many locations. The information base can store information regarding 3D parts that have been printed previously by a 3D printing system (or multiple 3D printing systems). Alternatively, or additionally, the information stored in the information base can come from a different source, such as a knowledge base derived by human experts, and so forth.

In accordance with some implementations, the information stored in the information base can also include design rules for respective 3D parts. A design rule can be a part-specific design rule, which is a design rule produced for a specific part (or a specific collection of parts). A part-specific design rule applies to an individual part (or an individual collection of parts), and does not apply to other parts (or other collections of parts). There can be different part-specific design rules for different parts (or different collections of parts). Alternatively, or additionally, a design rule can include a system design rule, which is to be applied when producing any part by a specific 3D printing system.

The information base can be specific to an industry or an entity (e.g., a company) based on available information about the industry (e.g., the aerospace industry, the automotive industry, etc.) or the entity, including information about 3D part features, materials, operational environment characteristics, environmental restrictions, and so forth, regarding 3D parts produced in the industry or by the entity. Different information bases (with respective part-specific design rules and system design rules) can be provided for respective different industries or entities.

Generally, a "design rule" can refer to any information specifying a dependency of a property of a 3D part on an aspect associated with printing the 3D part. The property of the 3D part can include a thermal property of the 3D part, a mechanical strength of the 3D part, a density of the 3D part, a thickness of the 3D part, a size of the 3D part, and so forth. An aspect associated with printing the 3D part can include any or some combination of the following: a characteristic of a layer of build material deposited by the 3D printing system, a characteristic of an agent used to process a layer of build material deposited by the 3D printing system, a characteristic of heating of a layer of build material performed by the 3D printing system, a characteristic of an airflow generated during 3D printing, and so forth.

Examples of characteristics of a layer of build material can include any or some combination of the following: a type of the build material, the form of the build material (e.g., powder form, liquid form, etc.), an amount (e.g., thickness or horizontal extent) of build material, and so forth. Examples of characteristics of an agent used to process a layer of build material can include any or some combination of the following: the type of agent (e.g., a fusing agent to fuse powders of a layer of build material, a detailing agent to define a boundary of a portion of a layer of build material that is to be fused or coalesced, an ink to provide a color on a 3D part, and so forth), an amount of the agent, location where the agent is to be delivered, and so forth.

Examples of characteristics of heat that is generated by a heater (e.g., infrared heat source or other type of heat source) can include any or some combination of the following: an amount of heat energy to be produced, a target temperature to be achieved by the heat energy, a time duration of the generated heat energy, and so forth.

Examples of characteristics of an airflow generated during 3D printing can include any or some combination of the following: a speed of an airflow generator, a direction of airflow, and so forth.

Generally, the design rule for a 3D part can be used by a 3D printing system to control an aspect of a 3D printing process based on a target property of the 3D part, where a 3D printing process can refer to any or some combination of the following: depositing a build material, dispensing an agent onto a layer of build material, preheating a layer of build material, adjusting an airflow generator, and so forth.

Similarity of 3D parts (as determined at 104) can be based on a comparison of properties of the 3D parts, including any or some combination of the following: a type of 3D part, a size of the 3D part, a shape of the 3D part, a material of the 3D part, a functional property of the 3D part, and so forth. Two 3D parts are considered to be similar if the difference between the 3D parts, in terms of difference(s) between respective property (or properties) of the 3D parts, are within a specified threshold.

In response to determining that the first 3D part is not similar to any 3D part referred to by the information base, the process includes extracting (at 106) a representation of the first 3D part and sending an indication to conduct an operation to produce a design rule for the first 3D part (a part-specific design rule). The extracted representation of the first 3D part can be in any of various target formats (e.g., a file, a document, a graphical image, etc.) and can include information provided with the request received (at 102).

The indication to conduct an operation to produce a design rule for the first 3D part can include a request, which can be in the form of a message, a command, an information element, and so forth, that provides an indication that production of a design rule for the first 3D part is desired. The indication can be set to a human operator, which can initiate the operation to produce the part-specific design rule. Alternatively, the indication can be sent to an automated entity, such as a program or a machine, which triggers the program or machine to perform the operation to produce the part-specific design rule. The operation to produce the part-specific design rule can include performing an experiment to produce the part-specific design rule, where an experiment can involve the printing of 3D test parts at multiple locations on a print platform, measuring parameters of the printed 3D test parts, correlating various measured parameters, and generating a part-specific design rule based on the correlating.

By being able to trigger the performance of an operation to produce a design rule for a part, incremental learning can be achieved, since design rules can be incrementally added to the information base for parts that have not been printed previously.

The process further includes receiving (at 108) the design rule generated based on the operation triggered by the indication sent (at 106). The received design rule can be used by a 3D printing system to print the first 3D part.

In response to determining that the first 3D part is similar to a matching 3D part referred to by the information base, the process of FIG. 1 retrieves (at 110), from the information base, a design rule for the matching 3D part to use in printing the first 3D part by a 3D printing system.

In accordance with some implementations of the present disclosure, as noted above, in addition to part-specific design rules, a system design rule can also be employed when performing 3D printing of a 3D part or of multiple 3D parts.

A system design rule indicates values of a property of 3D parts at different locations of a print target, whereas the print target can refer to a print platform or to an assembly of a partially formed 3D object. The property of a 3D part printed at different locations can differ. For example, a first location of the print target may be hotter (which has a higher temperature) than a second location of the print target (which has a lower temperature). Forming a given 3D part at the first location can result in a property of the given 3D part being different than the property of the given 3D part formed at the second location. An example of the property of the given 3D part can be a physical property, such as the mechanical strength, a density, a breaking stress/strain (which indicates the force when applied to the 3D part that would cause the 3D part to break), the Young's modulus (also referred to as an elastic modulus, which is a measure of the stiffness of a solid material), and so forth. The system design rule when used during 3D printing allows the 3D printing system to decide where a specific 3D part should be printed, given a target property of the 3D part. For example, if the mechanical strength of the 3D part is not important, then the 3D part can be printed in a cooler location on the print target. However, if the mechanical strength of the 3D part is important, then the 3D part can be printed in a hotter location of the print target.

Figure 2:
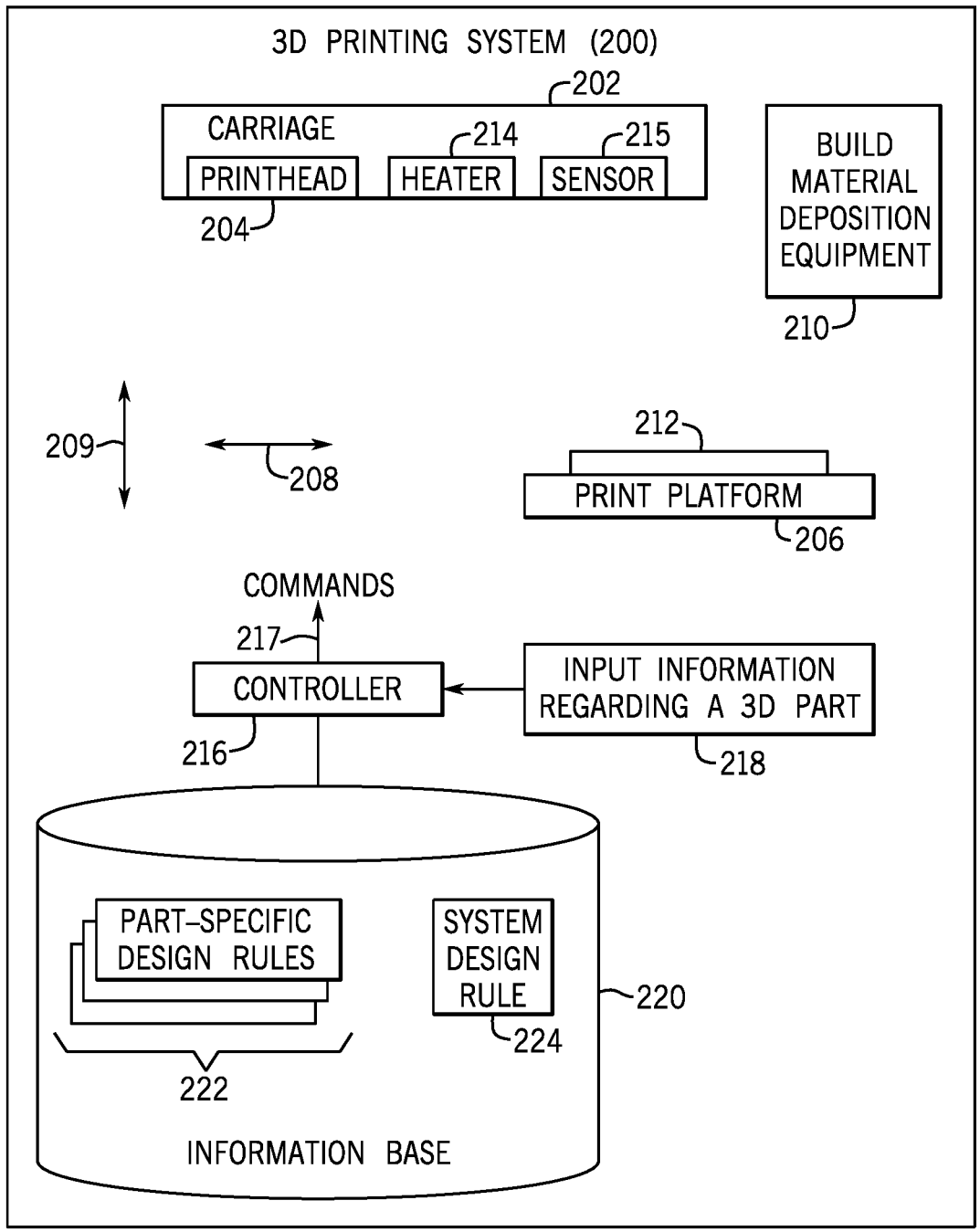
FIG. 2 is a block diagram of a 3D printing system according to some examples.

FIG. 2 is a block diagram of an example 3D printing system 200 that includes a carriage 202 that carries a printhead 204 according to some examples. A "carriage" can refer to a structure that is used for carrying components, including the printhead 204, as well as other components such as a heater 214 to produce heat, a sensor 215 to sense a respective parameter, and so forth. In other examples, the printhead 204, the heater 214, and the sensor 215 can be mounted on separate carriages. In further examples, the sensor 215 can be part of the printhead 204.

The heater 214 can be used to preheat a layer of build material, and the sensor 215 can be used to sense a parameter, such as a distribution of temperatures, across a layer of build material. The sensor 215 can include an infrared sensor or other type of temperature sensor to sense a temperature. Alternatively, or additionally, the sensor 215 can include a profilometer to measure a thickness of a layer. Other types of sensors can be used in other examples.

In further examples, the 3D printing system 200 can include multiple printheads, and/or multiple heaters, and/or multiple sensors.

The printing system 200 also includes a print platform 206. The carriage 202 and the print platform 206 are movable with respect to each other (along the horizontal axes as well as the vertical axis). In some examples, the print platform 206 is stationary while the carriage 202 can be moved along an axis 208, for example. In other examples, the carriage 202 can be stationary while the print platform 206 is moved relative to the printhead 202 along the axis 208. In further examples, both the carriage 202 and the print platform 206 can be moved along the axis 208. Note further that it is possible for the carriage 202 and the print platform 204 to be movable relative to each other along multiple different axes, including another horizontal axis that is perpendicular to the axis 208, and in a vertical axis 209, i.e., the axis where the print platform 206 and the carriage 202 can be moved to be closer together or farther apart). The relative motion of the carriage 202 and the print platform 206 can be driven by a motor (or multiple motors), not shown.

The relative motion of the carriage 202 and the print platform 206 can cause the printhead 204 to be placed at different positions. The printhead 204 can be activated to deliver an agent towards a print target 212 on the upper surface of the print platform 206. In a 3D printing system, the target 212 can include a layer (or layers) of build material onto which an agent (ink, fusing agent, detailing agent, etc.) can be delivered by the printhead 204.

The printing system 200 further includes a build material deposition equipment 210 to deposit a layer of build material onto the target 212. In some examples, the layer of build material can be deposited in powder form, and the powdered build material can be subjected to further processing to form a 3D object portion of a given shape, size, and color (using ink, a fusing agent, a detailing agent, etc.).

The printing system 200 also includes a controller 216 that can be used to control 3D printing by the printing system 200. The controller 216 can include a hardware processing circuit, or a combination of a hardware processing circuit and machine-readable instructions executable on the hardware processing circuit. A hardware processing circuit can include any or some combination of the following: a microprocessor, a core of a multi-core microprocessor, a microcontroller, a programmable integrated circuit device, a programmable gate array, and so forth.

In some examples, the controller 216 can control operations of the build material deposition equipment 210, the carriage 202, the printhead 204, the heater 214, and other stages of the 3D printing system 200, by sending commands 217 to the respective stages. The control of the operations of the 3D printing system 200 by the controller 216 can be based on input information 218 regarding a 3D part that is to be formed. The input information 218 regarding a 3D part can be provided with a request to print, as discussed above.

The controller 216 is also able to access an information base 220, which can store part-specific design rules 222 and a system design rule 224, as explained further above. Based on the input information 218 regarding a 3D part, the controller 216 can select a part-specific design rule from among the multiple part-specific design rules 222, to use in conjunction with the system design rule 224 to control printing of the 3D part by the 3D printing system 200.

Additionally, the controller 216 is also able to send an indication to conduct an operation to produce a design rule for a 3D part, in response to a determination that the 3D part (such as described in the input information 218) is not similar to any 3D part referred to by the information base 220.

In some examples, the controller 216 is able to perform a process as depicted in FIG. 1, or other process. Generally, the process of receiving a request to print a 3D part, and determining whether a design rule exists for a similar part that can be used in 3D printing, can be considered an online process, since the process is performed by a 3D printing system as part of 3D printing.

The operation to produce a design rule triggered by an indication sent in response to a determination that a 3D part that is the subject of a request to print is not similar to any 3D part referred to by an information base can be considered an offline process, since the operation to produce the design rule is conducted separately from processing of a print request by a 3D printing system.

Figure 3:
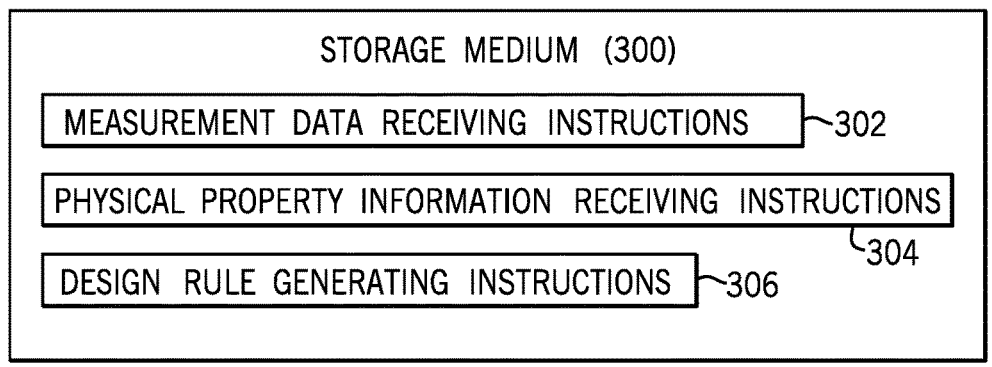
FIG. 3 is a block diagram of a storage medium storing machine-readable instructions according to some examples.

FIG. 3 is a block diagram of a non-transitory machine-readable or computer-readable storage medium 300 that stores machine-readable instructions that upon execution cause a system to perform tasks of an operation to produce a design rule (an offline process). As used here, a system can include a computer or a distributed arrangement of computers.

The machine-readable instructions include measurement data receiving instructions 302 to receive measurement data acquired by a sensor of a thermal property (or another property) of printed 3D parts at multiple locations on a print platform of a 3D printing system. For example, the sensor can be the sensor 215 in FIG. 2, which can be used to measure the temperature profile (or profile of another property) of multiple 3D parts printed at multiple locations on the print platform 206. A temperature profile can refer to a distribution of values of a property (e.g., a temperature) at the multiple locations on the print platform 206.

The machine-readable instructions further include physical property information receiving instructions 304 to receive information relating to a physical property of the printed 3D parts and the physical property's dependency on an aspect associated with printing the printed 3D parts at the multiple locations on the print platform. The aspect associated with printing can include any or some combination of the following: a characteristic of a layer of build material, a characteristic of an agent used to process a layer of build material, a characteristic of heat to heat a layer of build material, a characteristic of an airflow generated during 3D printing, and so forth.

The machine-readable instructions further include design rule generating instructions 306 to generate, based on the measurement data of the thermal property and information relating to the physical property, a design rule that governs a manner of printing a 3D part by the 3D printing system.

Figure 4:
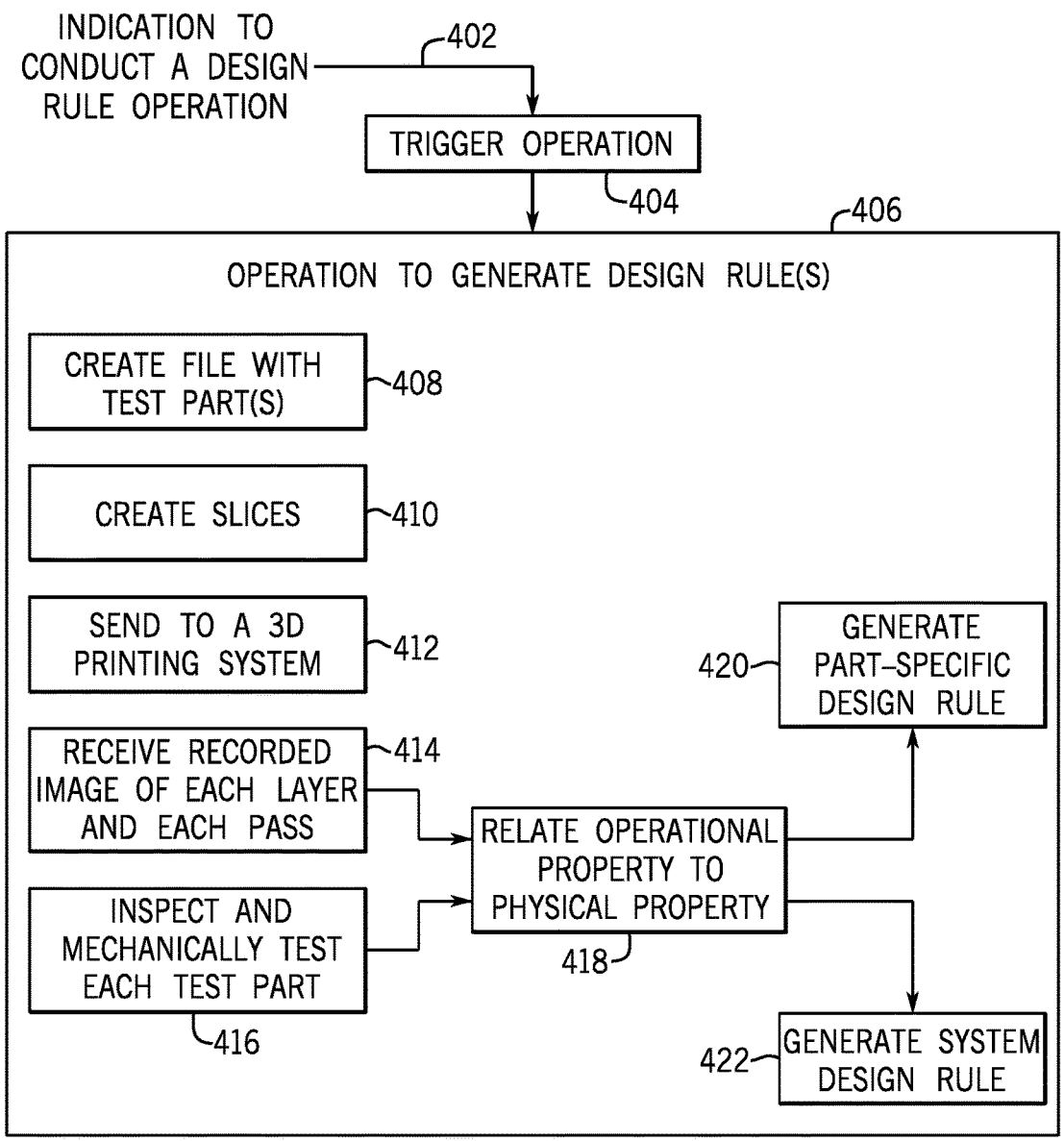
FIG. 4 is a flow diagram of a design rule generation process according to further examples.

FIG. 4 is a flow diagram of a process to perform an operation to produce a design rule (or multiple design rules), in accordance with further examples. The process receives an indication 402 to conduct a design rule operation 406 (to produce a design rule). This indication can be generated in response to a determination that a 3D part referred to by a request for printing is not similar to any 3D part referred to by an information base, as performed (at 104) in FIG. 1. In response to the indication 402, the process of FIG. 4 triggers (at 404) the design rule operation 406.

The design rule operation 406 includes creating (at 408) a file with test part(s). As used here, a "file" can refer to any information container that can be used to store information regarding a 3D test part (or multiple different types of 3D test parts), to be printed by a 3D printing system as part of the design rule operation 406. The file containing the information regarding the 3D test part(s) can include various properties of the test part(s), in 3D space. In some examples, the design rule operation 406 can print the same test part at a number of different locations. In other examples, the design rule operation 406 can print multiple different types of test parts at different locations. More generally, printing 3D test parts at multiple locations can refer either to printing multiple instances of the same 3D test part at the multiple locations, or multiple different types of 3D test parts at the multiple locations.

A 3D test part can be a test object such as a "dog bone" (which is a test structure shaped generally like a dog bone) or any other test structure that is to be printed by a 3D printing system as test parts. Alternatively, a 3D test part can be an actual part that is to be or has been printed by a 3D printing system.

Printing the same 3D test part or multiple different 3D test parts at multiple locations can allow for variability in a property (or properties) of the 3D test parts across multiple locations to be determined, where the variability can be caused by an inter-part effect (effect of a 3D part printed at a first location on a property of a 3D part printed at a second location).

Variability in a property (or properties) of the 3D test parts across multiple locations can also be due to effects of different powders, agents, heat, and so forth, used during 3D printing of the 3D test parts. For example, different 3D printing processes can be used to print the same 3D test part (or different 3D test parts) at respective different locations on the print platform. For example, at a first location on the print target, a 3D test part can be printed using a first 3D printing process (having a first combination of a characteristic of a build material, a characteristic of an agent, and a characteristic of heat, for example). At a second location on the print target, a 3D test part can be printed using a second 3D printing process (having a second, different combination of a characteristic of a build material, a characteristic of an agent, and a characteristic of heat, for example). Varying 3D printing processes to print 3D test parts at different locations can allow for a determination of how aspects of a 3D print process can affect properties of a 3D part.

Using the file containing the information regarding the 3D test part(s), the design rule operation 406 creates (at 410) slices of the test part(s), where the slices correspond to the multiple layers of the test part(s) that is to be formed by the 3D printing system. The slices that are created are sent (at 412) to a 3D printing system to print the test part(s) at multiple locations.

In addition to forming a 3D test part on a layer-by-layer basis (where successive layers of build material are deposited and processed), the 3D printing system can also perform multiple passes on each layer of build material. A pass can refer to an instance of a print process, such as depositing a build material, preheating the build material, dispensing an agent onto the build material, and so forth. In some cases, multiple passes can be performed on each layer. In other examples, just a single pass is performed on each layer.

The sensor (e.g., sensor 215) of the 3D printing system can be used to sense a property, such as temperature or other property, of each layer of build material and each pass during the 3D printing of the 3D test parts. The sensed property values are recorded into an image, where an image can refer to any representation of values of a property across a layer of build material. The design rule operation 406 receives (at 414) the recorded image of each layer and each pass. The recorded images for the layers/passes can be stored by the design rule operation 406 for later use. The examples further below refer to thermal property values (e.g., temperature values) in thermal images recorded by the sensor. It is noted that in further examples, images can contain values of other properties acquired by the sensor.

Each 3D test part that is printed at a respective location is inspected and physically tested (at 416). Physically testing a printed 3D test part can involve measuring a mechanical property of each test part, such as the mechanical strength of the test part. For example, the mechanical property can be measured using a strain gauge or other type of sensor. Based on the physical testing, the mechanical property values can be recorded into a data representation. In other examples, other physical properties (e.g., density, magnetism, conductivity, etc.) of each 3D test part can be measured using respective sensors.

The design rule operation 406 relates (at 418) the thermal property values (in the recorded images acquired by a sensor) and the measured physical property values of the printed 3D test parts to aspects (e.g., a characteristic of a layer of build material, a characteristic of an agent, a characteristic of heat generated, a characteristic of an airflow generated during 3D printing, etc.) of a 3D printing process used to form the 3D test parts at multiple locations. Each thermal image recorded by a 3D printing system sensor can include location information (e.g., coordinates) indicating where each measured thermal property value was measured. Similarly, the data representation including measured physical property values can also include location information (e.g., coordinates) indicating where each measured physical property value was measured. The locations at which the 3D test part(s) are printed can be determined based on analyzing a visual image (captured by a camera) to determine centers of mass of the printed 3D test parts at the multiple locations. Additionally, the aspects (e.g., a characteristic of a layer of build material, a characteristic of an agent, a characteristic of heat generated, a characteristic of an airflow generated during 3D printing, etc.) of the 3D printing process used form the 3D test part(s) at the multiple locations can also be recorded.

The relating performed at 418 produces a map or some other correlation data representation that relates, for each location at which a 3D test part is formed, an aspect of a 3D printing process to a thermal property and a physical property of the printed 3D test part.

The operation 406 uses the map to generate (at 420) a part-specific design rule, and to generate (at 422) a system design rule. In further examples, just the part-specific rule can be generated, without generating the system design rule.

The part-specific design rule can be generated in the following manner in some examples. Since different 3D printing processes can be used to print a 3D test part at different locations, a determination can be made (such as by a computer system) regarding how aspects of a 3D printing process affect properties of the 3D part. For example, a correlation can be produced that relates a first aspect of a 3D printing process (e.g., a first combination of a characteristic of a build material, a characteristic of an agent, a characteristic of heat, and a characteristic of airflow) to a first property of a 3D part, a second aspect of a 3D printing process (e.g., a second combination of a characteristic of a build material, a characteristic of an agent, a characteristic of heat, and a characteristic of airflow) to a second property of a 3D part, and so forth. In this way, this correlation can be accessed during 3D printing to select an aspect of a 3D printing process, from among multiple aspects, to use for achieving a target property of a 3D part to be printed, based on a request to print.

In some examples, a part-specific design rule can relate to a scenario where parts are packed together in a sparse pattern. The sparse pattern of parts can cause heat energy to be reflected from a layer of build material onto reflectors (e.g., parabolic mirrors) in the 3D printing system, from which the heat energy can again be reflected back onto the layer of build material. Depending on how many agents are being used for a given layer of build material, the 3D printing can compensate for this reflection of radiative energy by creating a design rule that analyzes the current build for sparsity (percentage fill in the current layer of build material for respective parts that is less than a specified threshold) and recommending an increase or decrease of power to a heater of the printing system based on the determined sparsity. More generally, the design rule can include for each layer of build material information (based on an experiment) to adjust a heater (or other equipment) of the 3D printing system to compensate for reflected heat energy, given a specific arrangement of parts (such as a sparse arrangement of parts).

In further examples, another part-specific design rule is based on geometric features of a part to be formed by 3D printing. For example, the geometric features can include small openings to be formed in a layer of build material. A 3D printing processing, such as a fusing process that involves dispensing of a fusing agent, may cause the part geometric features to deviate from their target sizes. For example, the fusing process may over-fuse a layer of build material. Other agents can have other effects that may prevent formation of a part with target geometric features. The design rule can include information (based on an experiment) specifying an adjustment of part geometries (e.g., sizes of geometric features of a part) to compensate for 3D printing processes.

In additional examples, another part-specific design rule can control the amount of agents used for a given layer of build material, based on color attributes or other attributes (e.g., mechanical strength) of a given part.

The system design rule can be generated in the following manner in some examples. In some examples, the same 3D printing process can be used to print a 3D test part at multiple locations. However, due to variability caused by inter-part effects, properties of the same 3D test part at multiple locations can vary, even though the same 3D printing process was used. Such variability can be used to create a map (or other data representation) that includes information indicating locations to use to achieve certain target properties of a 3D part. For example, the map can indicate that a first location is to be used to print a 3D part if a higher mechanical strength is desired, while a second location can be used to print a 3D part where mechanical strength is not a high priority. The map can include "real-estate" values indicating relative priorities for achieving a target property of a 3D part. The real-estate values can be numbers, codes, or other indicators specifying that, to achieve a target property of a 3D part, that certain locations on the print platform have higher priority than other locations on the print platform. Thus, for example, if it is desired to print a 3D part having a high mechanical strength, then the 3D part can be printed at a location on the print platform associated with a higher priority value in the system design rule for achieving mechanical strength.

More generally, a design rule indicates values associated with a physical property of 3D parts at different locations of a print platform. During 3D printing of a given 3D part, the controller of a 3D printing system can select a location of different locations on a print platform to print the first 3D part based on a target physical property of the given 3D part and the values associated with the physical property of 3D parts at the different locations indicated by the system design rule.

Figure 5:
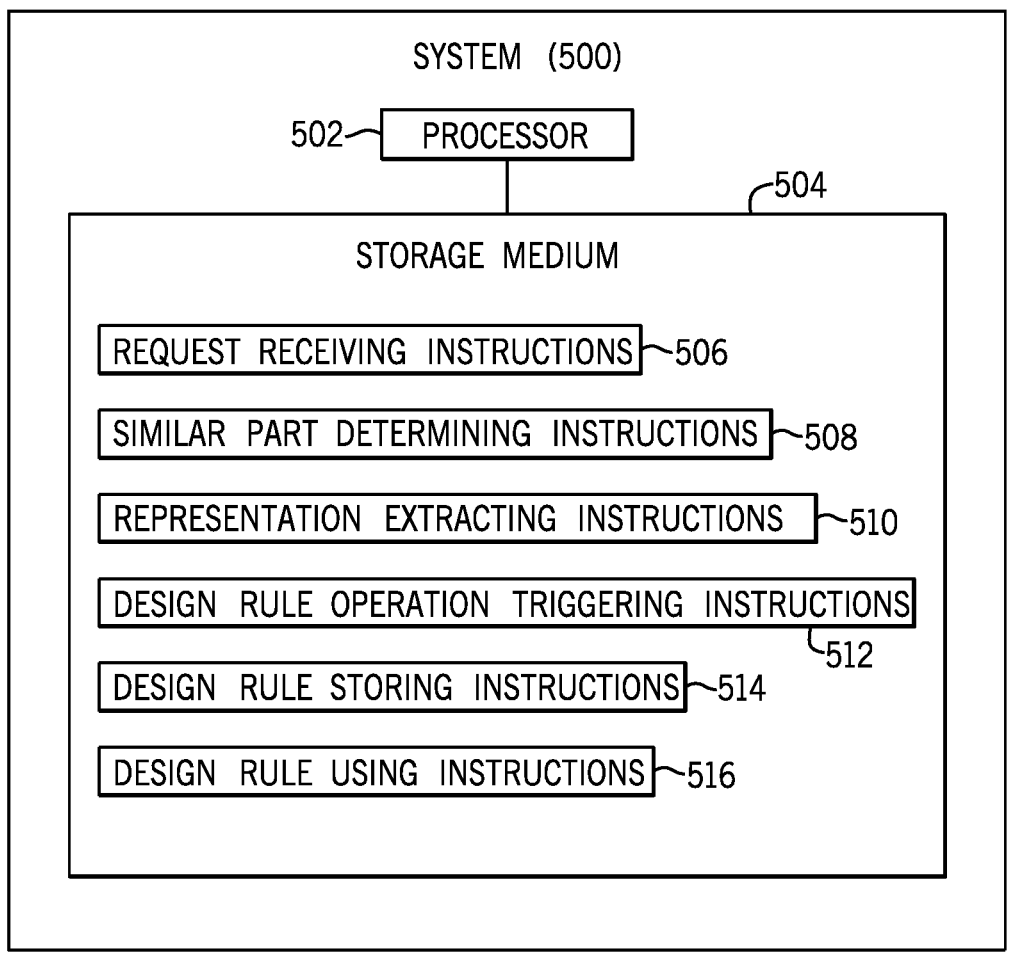
FIG. 5 is a block diagram of a system according to some examples.

FIG. 5 is a block diagram of a system 500 according to further examples. The system 500 includes a processor (or multiple processors) 502, and a non-transitory storage medium 504 storing machine-readable instructions that are executable on the processor to perform corresponding tasks. A processor can include a microprocessor, a core of a multi-core microprocessor, a microcontroller, a programmable integrated circuit, a programmable gate array, or another hardware processing circuit. Machine-readable instructions executable on the processor can refer to the instructions executable on one processor or on multiple processors.

The storage medium 504 stores request receiving instructions 506 to receive a request to print a first 3D part. The storage medium 504 further stores similar part determining instructions 508 to determine whether the first 3D part is similar to a 3D part referred to by an information base.

The storage medium 504 further stores the following machine-readable instructions that are executed in response to determining that the first 3D part is not similar to any 3D part referred to by the information base: (1) representation extracting instructions 510 to extract a representation of the first 3D part, (2) design rule operation triggering instructions 512 to trigger a design rule operation to produce a design rule for the first 3D part, and (3) design rule storing instructions 514 to store the design rule for the first 3D part in the information base.

The storage medium 504 further stores design rule using instructions 516 that are executed in response to determining that the first 3D part is similar to a matching 3D part referred to by the information base, where the design rule using instructions 516 are to use a design rule for the matching 3D part to print the first 3D part.

The storage medium 300 or 504 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a system comprising a processor, the method comprising:
   receiving a request to print a first three-dimensional (3D) part;
   determining whether the first 3D part is similar to a 3D part referred to by an information base, based on a comparison of a property of the first 3D part to properties of 3D parts referred to by the information base;
   determining, based on the comparison, that the first 3D part of the request is not similar to any 3D part referred to by the information base; and
   based on the determining that the first 3D part is not similar to any 3D part referred to by the information base:
      extracting a representation of the first 3D part and sending an indication to conduct an operation to produce a design rule for the first 3D part,
      causing 3D printing, by a 3D printing system, of plural instances of the first 3D part at plural different locations on a print platform as part of the operation, and
      generating the design rule based on the operation that includes the 3D printing and measuring characteristics of the printed plural instances of the first 3D part at the plural different locations on the print platform.

2. The method of claim 1, wherein the information base contains information specific to a given industry or entity.

3. The method of claim 1, wherein the design rule generated based on the operation is selected from among:
   a design rule that includes for each layer of build material information to adjust equipment of the 3D printing system to compensate for reflected heat energy given an arrangement of parts,
   a design rule that includes information specifying an adjustment of 3D part geometries to compensate for 3D printing processes, and
   a design rule to control an amount of an agent used for a given layer of build material based on an attribute of a given 3D part.

4. The method of claim 1, further comprising:
   adding the design rule generated based on the operation to the information base;
   receiving another request to print a second 3D part;
   determining whether the second 3D part is similar to a 3D part referred to by the information base; and
   in response to determining that the second 3D part is similar to the first 3D part referred to by the information base, use the design rule for the first 3D part to print the second 3D part, the design rule for the first 3D part specifying a dependency of a property of the first 3D part on an aspect associated with printing the first 3D part during the operation.

5. The method of claim 1, wherein the design rule generated based on the operation is a first design rule, the method comprising:
   in response to determining, based on the comparison, that the first 3D part is not similar to any 3D part referred to by the information base:
      relating the measured characteristics of the printed plural instances of the first 3D part to an aspect of a 3D printing process used in the 3D printing system to print the plural instances of the first 3D part,
      wherein generating the first design rule is based on the relating.

6. The method of claim 5, wherein the 3D printing of the plural instances of the first 3D part at the plural different locations on the print platform as part of the operation comprises 3D printing a first copy of the first 3D part at a first location on the print platform as part of the operation, and printing a second copy of the first 3D part at a different second location on the print platform as part of the operation.

7. The method of claim 6, comprising:
   determining a variability of values of a measured characteristic of the first copy and the second copy,
   wherein the relating is based on the determined variability.

8. The method of claim 1, further comprising:
   receiving a request to print a second 3D part;
   determining whether the second 3D part is similar to a 3D part referred to by the information base, based on a comparison of a property of the second 3D part to the properties of the 3D parts referred to by the information base;
   determining, based on the comparison of the property of the second 3D part, that the second 3D part is similar to a matching 3D part referred to by the information base; and
   based on determining that the second 3D part is similar to the matching 3D part referred to by the information base, retrieving a design rule for the matching 3D part to print the second 3D part, the design rule for the matching 3D part specifying a dependency of a property of the matching 3D part on an aspect associated with printing the matching 3D part.

9. The method of claim 8, wherein the design rule for the matching 3D part specifies a dependency of a thermal property and a physical property of the matching 3D part on the aspect associated with printing the matching 3D part.

10. The method of claim 8, further comprising:
using a system design rule and the design rule for the matching 3D part to print the second 3D part, the system design rule indicating values associated with a physical property of 3D parts at multiple different locations of the print platform.

11. The method of claim 10, wherein using the system design rule to print the second 3D part comprises selecting a location of the multiple different locations to print the second 3D part based on a target physical property of the second 3D part and the values associated with the physical property of the 3D parts at the multiple different locations.

12. The method of claim 10, wherein the system design rule includes values indicating which of the multiple different locations has a higher priority to achieve a target physical property.

13. A non-transitory machine-readable storage medium storing instructions that upon execution cause a system to:
receive an indication to conduct an operation to create a design rule;
in response to the indication:
receive measurement data acquired by a sensor of a thermal property of printed plural instances of a same three-dimensional (3D) part at a plurality of different locations on a print platform of a 3D printing system;
receive information relating to a physical property of the printed plural instances of the same 3D part and a dependency of the physical property on an aspect associated with printing the printed plural instances of the same 3D part at the plurality of different locations on the print platform, the aspect selected from among a characteristic of a layer of build material deposited by the 3D printing system, a characteristic of an agent used to process a layer of build material deposited by the 3D printing system, a characteristic of heat to heat a layer of build material, and a characteristic of an airflow used in 3D printing;
determine a variability in values of the physical property of the printed plural instances of the same 3D part printed at the plurality of different locations on the print platform; and
generate, based on the measurement data of the thermal property and the determined variability, a design rule that governs a manner of printing a 3D part by the 3D printing system.

14. The non-transitory machine-readable storage medium of claim 13, wherein the generated design rule comprises a part-specific design rule that is associated with an individual 3D part or an individual collection of 3D parts, and wherein the part-specific design rule specifies a dependency of a property of a 3D part on an aspect associated with printing the individual 3D part or the individual collection of 3D parts.

15. The non-transitory machine-readable storage medium of claim 13, wherein the generated design rule comprises a system design rule that specifies values associated with the physical property of the printed plural instances of the same 3D part at the plurality of different locations on the print platform.

16. The non-transitory machine-readable storage medium of claim 13, wherein the instructions upon execution cause the system to further relate measured values of the thermal property and measured values of the physical property of the printed plural instances of the same 3D part to aspects of 3D printing processes used to form the printed plural instances of the same 3D part at the plurality of different locations.

17. The non-transitory machine-readable storage medium of claim 13, wherein the instructions upon execution cause the system to:
communicate the generated design rule to the 3D printing system that uses the generated design rule in printing a 3D object.

18. A system comprising:
a processor; and
a non-transitory storage medium storing instructions that are executable on the processor to:
receive a request to print a first three-dimensional (3D) part;
determine whether the first 3D part is similar to a 3D part referred to by an information base, based on a comparison of a property of the first 3D part to properties of 3D parts referred to by the information base; and
in response to determining, based on the comparison, that the first 3D part of the request is not similar to any 3D part referred to by the information base:
extract a representation of the first 3D part,
trigger an operation to produce a design rule for the first 3D part,
cause 3D printing, by a 3D printing system, of plural instances of the first 3D part at plural different locations on a print platform as part of the operation, and
generate the design rule for the first 3D part in the information base based on the operation that includes the 3D printing and measuring characteristics of the printed plural instances of the first 3D part at the plural different locations on the print platform, wherein the design rule for the first 3D part specifies a dependency of a property of the first 3D part on an aspect associated with printing the first 3D part, the aspect selected from among a characteristic of a layer of build material deposited by the 3D printing system, a characteristic of an agent used to process a layer of build material deposited by the 3D printing system, and a characteristic of heat to heat a layer of build material.

19. The system of claim 18, wherein the measured characteristics of the printed plural instances of the first 3D part comprise:
measurement data acquired by a sensor of a thermal property of the printed plural instances of the first 3D part at the plural different locations on the print platform; and
measured information relating to a physical property of the printed plural instances of the first 3D part at the plural different locations on the print platform.

20. The system of claim 18, wherein the instructions are executable on the processor to further:
in response to determining that the first 3D part is similar to a matching 3D part referred to by the information base, use a design rule for the matching 3D part to print the first 3D part.

* * * * *